Jan. 10, 1961        E. WILBUSHEWICH        2,967,402
METHODS AND MACHINES FOR THE RAPID PRODUCTION OF ICE
Filed June 4, 1956        3 Sheets-Sheet 1
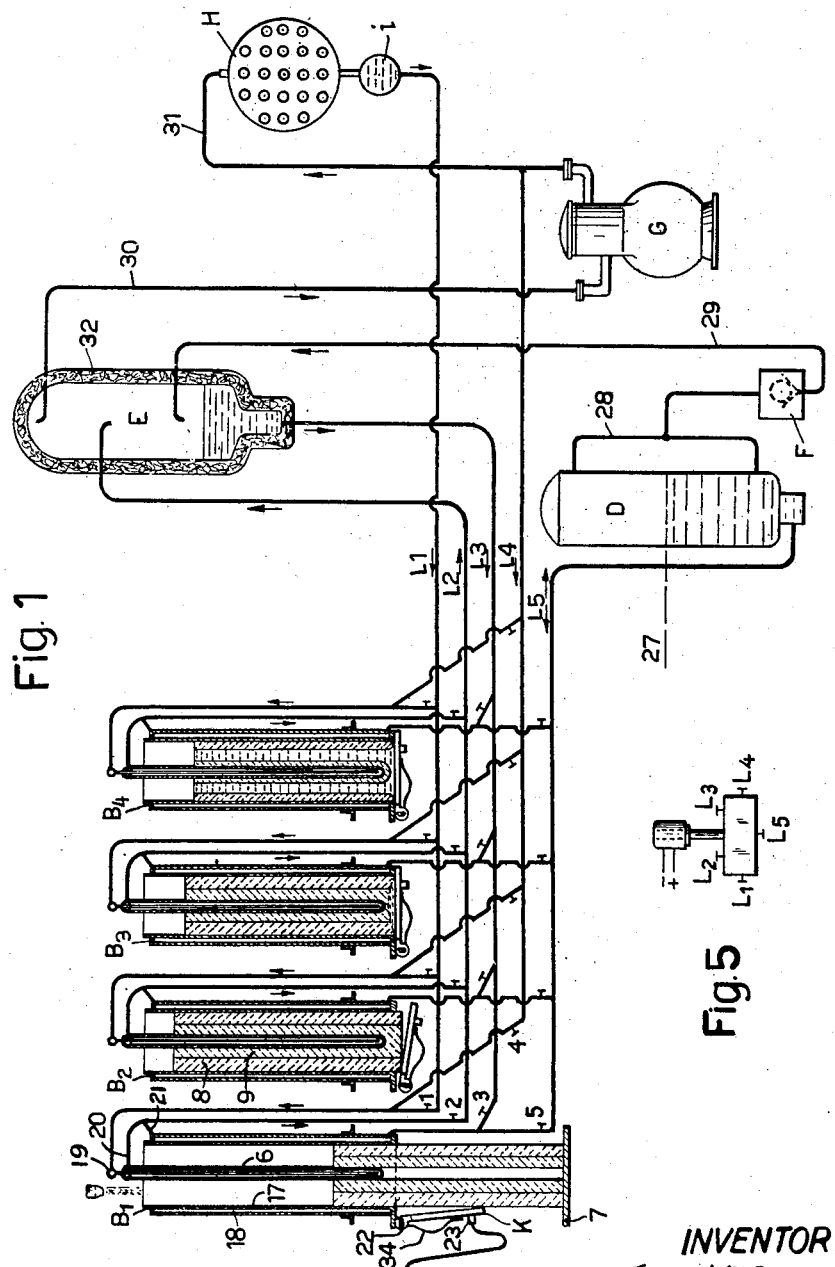
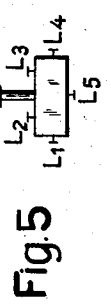
INVENTOR:
EUGEN WILBUSHEWICH
By A. John Michel
ATTORNEY FOR APPLICANT

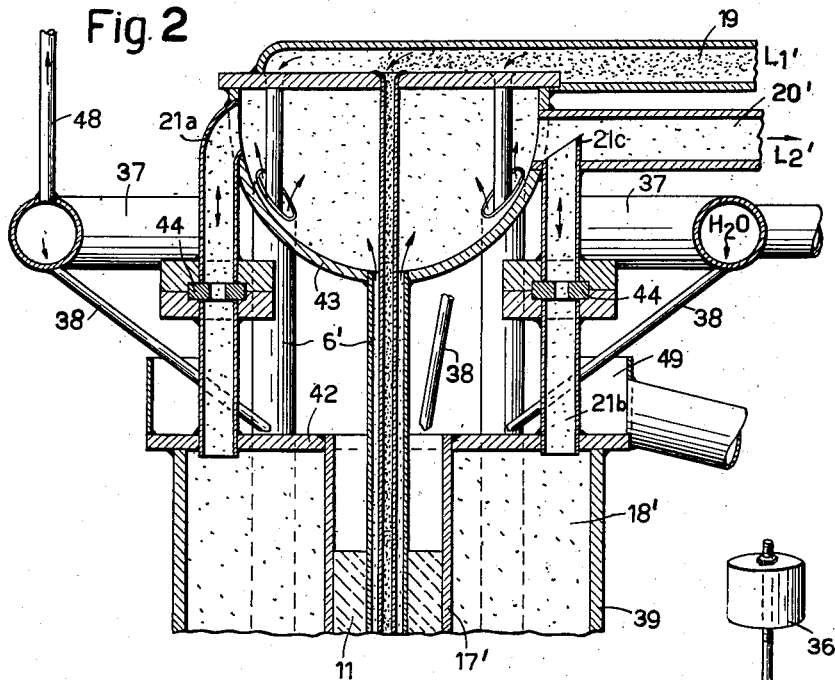
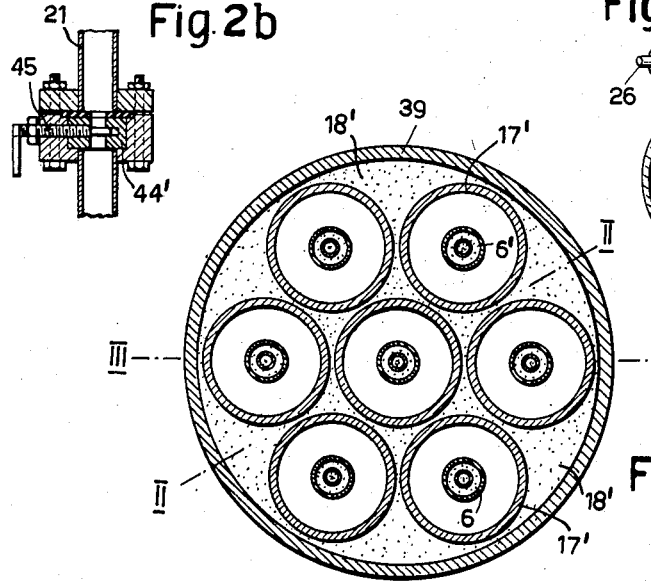
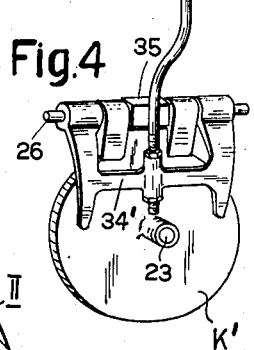

United States Patent Office 2,967,402
Patented Jan. 10, 1961

2,967,402

METHODS AND MACHINES FOR THE RAPID PRODUCTION OF ICE

Eugen Wilbushewich, Kanzleistrasse 127, Zurich, Switzerland

Filed June 4, 1956, Ser. No. 589,264

Claims priority, application Great Britain Apr. 20, 1956

5 Claims. (Cl. 62—73)

The present invention refers to methods and machines for rapidly producing ice. It uses cooled-down and subsequently warmed-up tubes in direct contact with the evaporators of a refrigeration plant for eventually harvesting the ice in the shape of hollow rods for ready cutting, or crushing, into small pieces thereof, i.e. as cubes or like shapes.

It is the principal object of this invention to speed up almost to the theoretical limit cylinder-rod or small-ice producing systems by means of improved, economical methods and by machines of simple construction which readily allow continuous operation so as to yield high quality ice products similar to those of iceblock machines, such as disclosed, for instance, in my U.S. Patent No. 2,723,534.

The invention is based on the fact that, with multiple evaporators for directly cooling the water contained in ice molds, the core evaporator will contribute most of the produced ice in a given period of time while the contributing effect of the jacket evaporator, in comparison, remains rather insignificant, no matter whether only one refrigerant circuit is adopted or this main circuit is divided, with the jacket evaporator placed in a subsidiary branch, during the freezing period. With this latter arrangement in view, the invention is further concerned with utilizing the fact that changes in the amount and/or temperature of the refrigerant in the main circuit through the core evaporator will have a more far-reaching effect on the rapidity of ice production than changes of corresponding degree and similar nature taking place in the jacket evaporator and that, for this reason, the said subsidiary refrigerant circuit can become of secondary importance in regard to the amount and/or temperature of the refrigerant passing therethrough during the freezing period. These considerations do not apply to such an extent for the relatively short ice-detaching, or thawing, period and can then be disregarded.

The main feature, therefore, of the invention is a method for the rapid production of hollow ice rods whereby all the tubes are simultaneously cooled both by a common jacket evaporator and by a slender concentrical core evaporator contained in each tube and whereby the refrigerant of a refrigeration plant invariably is caused first to circulate through the core evaporators and is then let into the jacket evaporator, during the freezing in a subsidiary refrigerant circuit and during the thawing period by a refrigerant filling operation for the evaporators without further circulation.

According to another main feature of the method according to the invention, hollow ice rods are rapidly produced in tubular ice molds comprising two concentrically acting evaporators for the refrigerant, whereby due to using different amounts of and/or the use of different temperatures in the main and subsidiary circuits of the refrigerant, the freezing of ice occurs at a substantially different rate by the core and jacket evaporators, whereas due to the use of a warm refrigerant throughout in one circuit during the evaporator-filling operation when thawing occurs, the ice is then detached from the walls of the evaporators at almost the same rate.

The rapidity of ice production by these methods will be affected by many constructional and thermodynamic factors and, for best results, it is necessary to be able to balance, at least during the freezing period, the stated difference in the amounts and/or temperature of the circulating refrigerant so that for a given set-up, optimum use is made of the effectiveness in the ice formation simultaneously occurring both from the core and the jacket of the tubular ice mold. According to another feature, the method of the invention provides that, in contrast to the set amount of refrigerant circulating through the core evaporators, the amount let into or circulating through the jacket evaporator is pre-settable or adjustable, at least during the freezing period.

One main feature of the ice-producing machine according to the invention is directed to the use of exchangeable striction rings, or other screw adjusting means, interposed in the pipes over which the said subsidiary circuit of the refrigerant is let into the jacket evaporator.

By applying these methods, with the core evaporator for the ice molds principally allotted for the ice production, long hollow rod-shaped ice can be obtained very rapidly, provided that further features are incorporated in the machines for putting these methods into effect. For, in actual practice for each given rod size, "super-rapid" freezing times can only be achieved by initially aligning the long tube-molds and their pendant, slender core evaporator in perfect concentricity, but by keeping them concentric also under often severe operational conditions. Chiefly due to the sometimes violent effervescence of the liquified refrigerant becoming gasified within the confined space of the core evaporator during the first part of the freezing period, mechanical vibrations and movements are set up which could damage the machine or cause a lasting eccentricity, prolonging the time required to complete the hollow ice rod.

According to the invention, therefore, in an ice producing machine of the type set forth comprising long tubular ice molds and long concentric internal and external evaporators therefor, it is proposed to eject a fraction only of the thawed off ice rod with the part left inside the tube and around the lower end of its core evaporator acting, during the subsequent freezing and tube-filling period, as a plug for the said mold and also as a centering and weighting means for its core evaporator.

Concentrically steadying the core evaporator by the ice plug at its tip will materially add to the accuracy in determining the time required for the completion of the ice rods, and the minutes that can be saved by these measures in each freezing cycle would be wasted if means were not provided cyclically to control the freezing, thawing, and mold-filling periods, with additional means perhaps to control the breaking action, at certain times, of the ejected ice rods. It is known already to control by means of time switches, the tube-ice plant's freezing and harvesting cycle and also evenly to phase-displace these cycles if more than one freezing tube group is present.

The invention is mainly concerned with machines for producing hollow ice rods in tubular ice molds and, accordingly, it provides for a time control not only of the refrigerant circuits i.e. the freezing and thawing periods, but also of the mold filling and/or ice breaking periods, which periods are either subsequent to or partly overlapping the first mentioned periods, when continuous operation is wanted.

If only a temporary operation is contemplated, or for each starting up of the machine, it is important automatically to set the time control in motion at one given moment, the automatic cyclic control preferably to begin after the completion of the first ice rod subsequent to an initial manually controlled freezing operation and mold filling action. In accordance with the invention this automatic start of the time control for the continuous ice production after an initial manual control is effected by utilizing the elongation forces becoming available upon the completion of the said first-produced ice rod.

Further improvements concern the bottom flap which is first to be used for sealing the tubular ice molds when starting up the machine and which, in order effectively to utilize the said ice elongation are lowerably hinged then to become detached from the bottom flange of the molds to which it had initially been frozen, eventually then to let this first-produced ice rod emerge in a thawing and flap-tilting operation.

It is known to use return springs both for the tilting to the horizontal position and for lifting the bottom flap; it is also known for a mere tilting flap, to use a counter balance fixed to the flap proper. The invention, in contrast has a lowerable and tiltable flap for its tubular ice molds, which is controlled by one combined counter balance for restoring an opened flap to its horizontal, lifted position.

The required quantity of water to start up operations is, as was explained, far greater than the one for refilling the tube-molds later, with part of said molds occupied then by the plugging ice-rod. Means must, therefore, be provided for a first alternative supply to be manipulated, and accurately to level it out amongst all the tube molds of a group.

According to another feature of the invention, the bottom flap which is common to a group of flat-flanged tube molds, comprises grooves acting as channels between neighboring tubes of the group to interconnect all the tubes of a group upon filling one of them. Alternatively the tube flanges can be interlinked and channelled there to act, or to increase in, the intercommunication of the water, or the like liquid, when initially the bottom flap for said tube molds is in its lifted position and one of the group of tube molds is filled.

In the accompanying drawing, which shows by way of example, an embodiment of the invention, I have illustrated these and appended aspects of the invention.

In the drawing,

Fig. 1 is a diagram of a refrigeration plan for the rapid production of hollow ice rods;

Fig. 2 is a sectional view, along line II—II of Fig. 2a, of the top part of the elevation of an ice rod producing machine;

Figure 2a is a plan view of the ice freezing rods such as shown in Figures 2 and 3.

Fig. 2b is a section of an adjustable valve for restricting the admission of refrigerant to the jacket evaporator;

Fig. 4 is a rear view of the said flap; and

Fig. 5 is a diagram of a multi-way electromagnetic valve.

Figure 3:
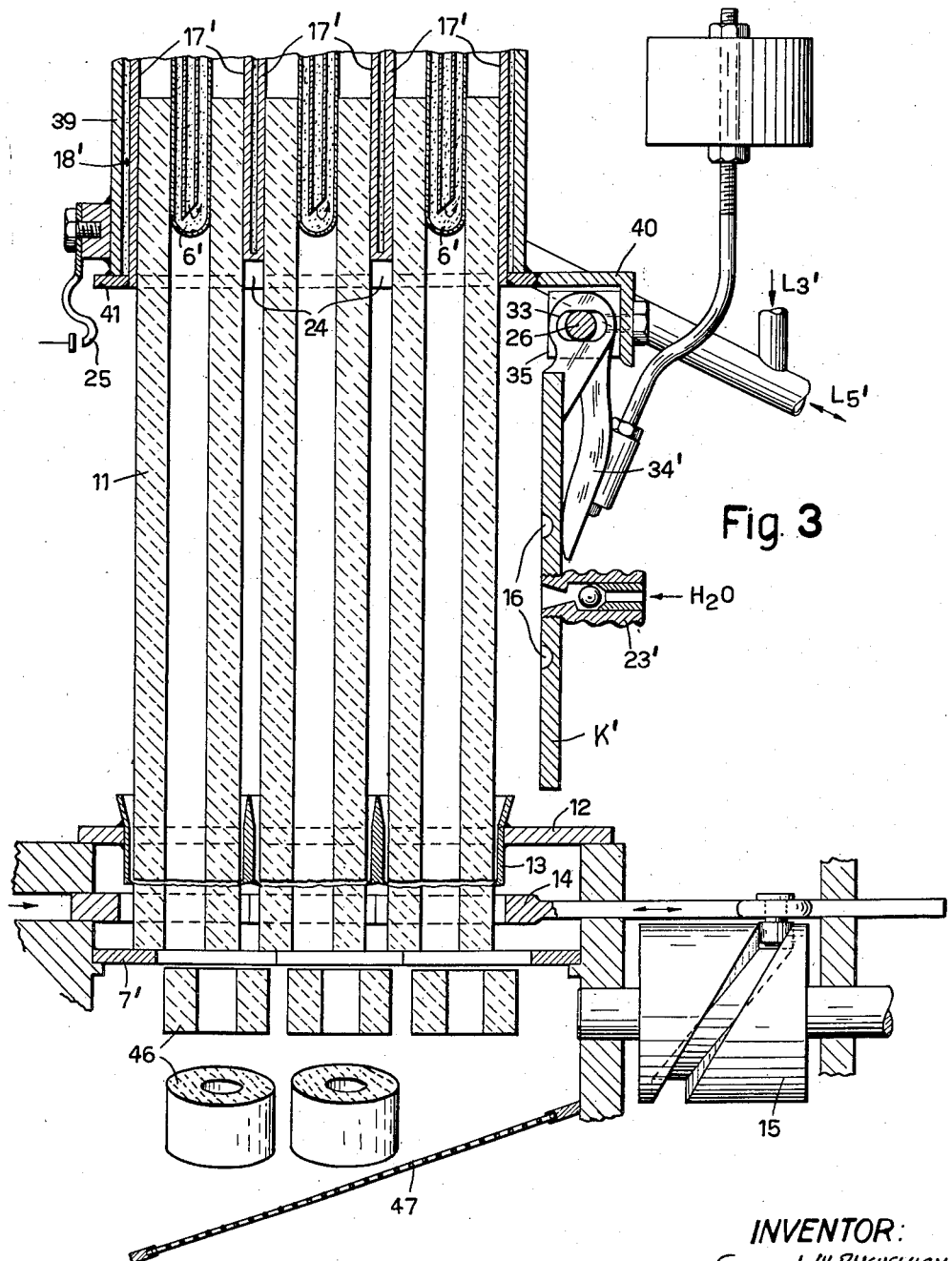
Fig. 3 is a sectional view, along line III—III of Fig. 2a, of the lower part of the elevation of an ice rod producing machine, also showing the bottom-flap and rod-breaking mechanism.

In the diagram of Fig. 1, on the right, a refrigeration plant is shown comprising a compressor G, a condenser H and its liquid receptacle $i$, a liquid separator E (heat insulated at 32) and a receiver vessel D with float valve F. The compressor G is connected to the separator E by the suction line 30, and also, to the condenser H by the delivery line 31; besides, the delivery side of the compressor G is also connected, via line L4 to the ice mold batteries B1–B4.

On the left of Fig. 1 are shown four single ice molds representative of a group of, say, tubular molds of batteries B1 to B4. These batteries are shown in sectional diagrammatic view at different stages of their operation, viz.: B1 has just ejected a completed, and thawed-off, hollow ice rod pushing open the bottom flap K, and as indicated on top, the refill operation has commenced; B4 shows the start, and B3 the end of the ice rod formation, during the freezing operation; B2 shows the battery upon the start of the thawing operation which can automatically be initiated through the elongation forces developing when the ice rod has been completely frozen, causing the lowering of the so-far frozen up bottom flap.

Batteries B1 to B4 are identical and each (as indicated with reference numerals applied to battery 1 only) has a tubular mold 17 surrounded by jacket evaporator 18 and a concentric core evaporator 6. Refrigerant is fed into the latter via the inlet pipe 19, the inlet pipes of all batteries being connected to a common line L1, and leaves via the suction pipe 20, the suction pipes of all batteries being connected to a common line L2. The inlet pipe 21 branches off pipe 20 to let liquid refrigerant droplets of the moisture-laden gases recirculating through pipe 20 settle into the jacket evaporator 18.

The main refrigerant circuit is constituted by liquid receptacle $i$ of condenser H, supplying liquefied cold refrigerant to line L1, line 19, core evaporator 6, line 20, line L2, liquid separator E, line 30, compressor G and line 31 back to the condenser. A striction ring or like regulator (not shown) is fitted into the admission pipe 21, on top of the jacket evaporator, to balance the amounts of refrigerant passing along pipe 20 and that admitted to evaporator 18 via pipe 21.

Since moisture in droplet form passes from line 20 through branch pipe 21 into jacket evaporator 18, the gases in the main refrigerant circuit become somewhat drier even before reaching main liquid separator E where all moisture is removed by settling in the sump of the separator. Line L3 is connected to the liquid separator sump and leads into the major jacket evaporator supply line L5 connected to vessel D.

When starting the machine, water to be frozen can be let into the mold through the socket 23 in the flap K, assuming this to be in the horizontal, closed position and also assuming that in an initial freezing operation the wet flap bottom was frozen to the mold flange to seal it by freezing on. This stage is shown in Fig. 1 for batteries B4 or B3. At 22 it is shown that the flap K is hinged in eye-holes which will permit both a lowering and a tilting of the flap; also, at 34, a flap returning means, which preferably can be a counter balance, is indicated.

The pipes leading to and from the jacket and core evaporators of each battery connect up with the common lines L1, L2, L3, L4 and L5 of the refrigeration plant via valves, as shown at the left of Fig. 1 in connection with battery B1. Valves 1 and 3 are check valves; the other valves operate as follows: during the freezing operation valve 2 is open and 4 and 5 closed, and during the thawing operation valves 4 and 5 are open and valve 2 closed. Float valve F is in pipe 29 linking the vessel D with separator E.

As is shown for batteries B4 and B3, ice is formed in the freezing process in the shape of cylinder shells 9 and 8 around the core evaporator and along the tube wall 17 of the jacket evaporator 18. Ice formation decreases significantly with increasing shell thickness, but in a given period of time, ice develops much faster for shell 9 than for shell 8, the proportional rates of ice formation of course depending on various constructional and thermodynamic data. By suitable choice of the striction rings, or through corresponding adjustment of the regulators in the admittance pipe 21 for the jacket evaporator 18, the requisite balance can be attained, for a shortest possible total period required for completing the hollow ice rod, composed of inner and outer shells 9, 8 of ice. When the ice rod is complete, the elongation acting downwards will tear open, as explained above and shown for battery B2, the ice seal of flap K by lowering the same, at the same time mechanically or electrically initiating control operations, mainly the thawing process.

For electrical control operations, a simple multiway solenoid valve, as diagrammatically shown in Fig. 5, can be used. It can serve for the control of the refrigerant circuits through the batteries and apart from being actuated from the said flap K upon becoming lowered, it can be program-controlled through time switch actuation when automatic-continuous cyclic operations are to be maintained for a steady ice-rod and small-ice production, after an initial manual starting-up process.

The refrigerant circuits during the freezing and the thawing operations, for ice-rod manufacture in the mold batteries B1–B4, are as follows:

The refrigerant gases which are sucked away from the liquid separator E over pipe 30, become compressed in the compressor G and reach, in a hot-gaseous state, via pipe 31 the condenser H and its liquid receptacle $i$, from there to be available in a cold-liquefied form over line L1 and the corresponding check valves 1 to the batteries B3–B4, that happen to be in the freezing process. There, the cold refrigerant is injected, via pipes 19, into the core evaporators 6 near their tip, leaves the said evaporators 6 via the pipe 20 and is returned through suction line L2 to the liquid separator E.

The core evaporator, in drawing away the heat from the water in the mold, gasifies the greater part of the refrigerant circulating therethrough. The droplets carried away through pipe 20 are mechanically deflected into the pipe 21 of the jacket evaporator 18 by a baffle. As seen in Fig. 2, the baffle may be formed in the pipe 20 by a projecting lip $21c$ of the pipe $21b$. The small amount of liquid refrigerant thus admitted through the striction ring 44 (Fig. 2) is gasified on the wall 17 of the mold tube, and cools the same. The branch pipe 21, collecting the droplets from the main circuit of pipe 20, will materially help in rendering the gases dry before they enter the final liquid separator E via suction line L2, thus increasing the efficiency of the separator. Liquid refrigerant also enters the jacket evaporator 18 via the thin compensating line L3, and the corresponding check valve 3, during the freezing process. The gaseous refrigerant is released through the pipe 21 and striction ring 44 into the pipe 20 for return to the compressor G.

In this manner ice shells 9 and 8 develop at different rates around evaporators 6 and 17 and, finally, meet to complete a composite hollow ice rod (Fig. 1, B3).

Following the completion, and subsequent to the then effected elongation, of the ice rod (Fig. 1, B2), the thawing process is started. Here, valves 1, 2, 3 are held closed, while valves 4 and 5 are opened. Consequently, instead of the cold medium via line L1, the warm medium available via line L4 is led into the core evaporator 6 through pipe 19, pushing away any cold refrigerant that still may happen to fill its space and, as valve 2 is closed, pushing it also through the space of the jacket evaporator 18 and line L5 into the receiver vessel D. The warm refrigerant will now fill up, at about the same temperature, both the core and jacket evaporators and detach the ice from the walls allowing the rod to fall downwards by pushing aside the flap K.

When valve 5 is open, the cold liquid refrigerant is displaced via line L5 into the receiver vessel D, which is not heat insulated, and will normally fill up this vessel to the middle, say level 27. If, however, more liquid arrives, it will be sucked up via overflow pipe 28 and float valve F through pipe 29 into the separator E, from the sump of which it can be distributed to other batteries, via line L3, which are in the freezing stage and require compensation for loss of liquid in their jacket evaporators.

When a battery of molds is defrosted to release the frozen rods therefrom, only pipes L4 and L5 are effective and the hot-gaseous vapors seek out the serially connected evaporators and push out liquid contained therein toward vessel D before entering condenser H through line 31. This is caused by the fact the evaporators are very much colder than the relatively warm condenser H.

In this manner, the battery evaporators act as condensing means because the hot gases become liquified therein and this liquid is added to the one transferred to vessel D. Surplus hot gases not needed for the defrosting operation also divert to line 31 into condenser H. The condenser, therefore, need handle only a smaller amount of hot gases than would otherwise be required and its requirement for cooling water is accordingly smaller, making it very efficient despite its smaller size.

The system operates in the following manner:

During the freezing cycle, due to the then prevailing suction in line L2, the cold liquid refrigerant is led from liquid receptacle $i$ via main supply line L1 to core evaporators 6, droplets from the moisture-laden gases passing from the core evaporators into line 20 settle in the jacket evaporator 18 through striction line 21 and additional cold liquid refrigerant from the sump of liquid separator E enters the bottom of the jacket evaporator through line L3.

During the defrosting cycle, lines L1–L3 are closed due to the pressure of hot gases in line 31 and the gases will initially rush along line L4 toward the cold evaporators 6 and 18. Soon, however, striction rings 44 in pipes $21a$ and $21b$ (see Fig. 2) will markedly retard the speed of the gas flow, as liquid refrigerant is pushed out of the seven core evaporators $6'$ into the jacket $18'$ and, further, through line L5 into temporary receptacle D. After vessel D is about half-filled to level 27, gas pressure equilibrium obtains. A short additional period with the gases stagnating in the evaporators is then allowed to complete the defrosting of the ice rods or blocks.

It will be noted that the direction of liquid and gaseous refrigerant circulation remains unchanged during the freezing and defrosting cycles, i,e, the refrigerant invariably enters through the thin injector tube of the core evaporators.

The emerging ice rods drop onto a plate 7 which is disposed at such a distance from the molds that the top part of the rods 8/9 remain in the molds to act as a plug for sealing and core-centering or weighting purposes, as was set forth above.

The sealing of the ice mold is accomplished by commencing to freeze again, after the emergence of the rod, and then filling the mold again from the top, as shown for battery B1. The ice rods can be harvested in known manner after breaking the ejected rod. Suitable breaking mechanism can be combined with the mold batteries, also for producing small pieces, or cubes of ice, as will be described hereinafter.

The described rapid ice producing method and machine can of course be modified to permit the harvesting, too, of incomplete, i.e. not composite, ice cylinders, the individual shells 8 and 9 then to be broken into crushed ice, and the non-frozen water to be collected and recirculated to let it run along the evaporator walls 6 and 17 pre-cooled for rapid ice production, without using molds.

The machine shown in the embodiment of Figs. 2, 2a and 3 comprises essentially, a bundle of, for instance 7, long tubular ice molds $17'$, each concentrically incorporating its pendant core evaporator $6'$. The tubes are, on top and below, welded into the end plates 42 and 41 of a drum 39. The outside of the drum is heat insulated (not shown). The space $18'$ inside the drum represents the jacket evaporator for the bundle of tubes; refrigerant is being admitted, in the example Fig. 2, via two inlet pipes $21a$, $21b$ also welded into the end plate 42. Below, the space $18'$ has the pipes $L5'$, $L3'$ for connecting the evaporator via valves (not shown) to the corresponding line of the refrigeration plant.

The size of the inlet pipes $21a$, $21b$ can be decreased by the striction rings 44 (Fig. 2) having a preset hole; otherwise, as is shown in the alternative Fig. 2b, an adjustable cone valve $44'$, 45 can be employed, which is always accessible for regulation. These pipes 21a, 21b, and other locating means (not shown) on top of the drum 39, also carry the hemispherical manifold 43 with the welded-on core evaporators 6', their inlet pipe 19' leading to line L1' and its branch line (not shown) corresponding to line L4, and suction pipe 20', leading to line L2'.

The bottom endplate 41 of the drum 39 (Fig. 3) has an angle piece 40 attached for mounting the square block 35 which carries the spindle 26. As is shown in Fig. 4, this spindle 26 holds the flap plate K' and independent thereof, a pressure fork 34' with its counter balance 36. The eyes 33 of flap K' are oblong in a direction allowing the flap not only to swing open but also to become lowered in its horizontal position. The flap K' is common to all seven tube molds 17'. Grooves 16 are milled into the inside face of flap K' and corresponding grooves or channels 24 are provided in the mold walls where they meet neighboring tubes, so that in the horizontal, closed flap position all the tubes are intercommunicating.

Initially, when the flap K' is used for the starting of the machine, water or like liquid to be frozen, is let in through the central stud 23' and the water can readily level out in all tube-molds by spreading along through the grooves 16 and/or channels 24. Later on, when the molds are plugged by ice, the refill water is let in from above (Fig. 2) via the header ringpipe 37 and the pipes 38, in measured quantities into each mold; an overflow 49 and a vent pipe 48 are also provided.

The front of flap K' cooperates with contact 25 (Fig. 3) in such a manner that contact 25 is actuated only in the instance when, due to the ice elongation, the flap is somewhat lowered. Similarly, a contact (not shown) can be provided to be actuated by the flap K' in its tilted, swung-open position. The said contact or contacts, can cause remote controlled valve or mechanical operations necessary for the automatic operation of the machine, when after its starting up program-cycling is to commence, at a given moment.

The tube molds are rather long and of a small size, so that after a few minutes only, long, hollow rods of ice 11 are produced. Fig. 3 shows the situation at the start of a refill operation after the downward ejected ice rods 11 have been lowered almost completely, i.e. with their top part still inside the molds 17'. There, they act as a plug and a core centering means after becoming frozen to the walls of 17' and 6'.

Underneath the ice producing machine, and preferably mechanically connected therewith (not shown) is the ice collecting and breaking mechanism. It comprises a stop plate 7' with relatively large openings not in alignment with the centres of the tubes 17', a centering and cutting grille plate 12 with let-in knife-edged bushes 13, and a breaking comb 14 subjected to an oscillating horizontal movement by means of the grooved drum 15. The distance between the circular knives of the bushes 13 and the stop plate 7' is such that hollowed small cylinders 46 are broken from the rods 11 at each return stroke of the comb 14 and then fall through the offset apertures of the plate 7'. A grille or other slide 47 deflects the falling cubes or ice pieces into a receptacle or onto a conveying means (not shown). Any melt water or ice particles fall straight through into a reservoir (not shown) to be re-used eventually for mold filling. The number of breaking actions by the comb 14 and/or the thawing period permitting the stepwise lowering of the rods 11 onto the stop plate 7' is, of course, so adjusted as to leave the top ends of the rods inside the lower part of the molds 17', as is shown.

The very rapid ice forming and thawing times possible with these machines can be determined exactly and kept up during continuous operation. For rod sizes of 1¾" outer diameter and about ⅝" hole diameter, independent of the rod length, only approx. 5 minutes (and for the colder seawater ice approx. only 9 minutes) are needed for one cycle of operations. If more than one battery of, say 7, molds are used, the operational cycles can be displaced aiming at a continuous harvesting of ice from any one battery of the plant. These continuous freezing and thawing cycles, and also their phase-displacement when more than one battery is used, can advantageously be controlled by time switches, or like programming means which, in known manner can be started to commence operations by, say, the contact 25 above referred to. With ice mold filling and ice rod breaking actions interspersed or overlapping the control actions for the refrigerant circuit during freezing and thawing, the time switch, or the like, need not become unduly complicated, particularly when the simple solenoid valve of Fig. 5 for the control of the refrigerant circuits is employed.

The example of Figs. 2–3 shows a small battery comprising merely 7 tubes. This however is not meant to restrict the scope of the invention. Rather, the number of tube molds in a bundle, their length and size, as well as their arrangement within a drum or other outer evaporator case can be adapted to the prevailing conditions and requested performance. Special conditions, for example, arise when instead of tapwater, seawater-ice rods and pieces thereof are to be produced.

So far, it had been difficult if not impossible to produce a satisfactory seawater ice or fruit juice ice blocks, frozen tomato puree, or the like, i.e. from liquids in which mineral, organic, or other chemical matter is evenly dissolved or dispersed. If such liquids are frozen conventionally by methods and machines involving a gradual yet steeply decreasing rate of ice formation around the wall of a refrigerant evaporator, segregation of the salts and other dispersed matter will occur. Instead of the "homogeneous" seawater, or the like, ice, the conventional methods will produce ice the character of which is altered and the melt product of which, too, is a different one.

The super-rapid ice producing system of the present invention prevents practically any sort of segregation and yields a homogeneous ice product of a novel, improved character with economical machines. This ice has an enhanced quality rendering it eminently suitable for the fish conserving, nutrition, chemical, and like industries.

I claim:

1. A refrigeration plant for the rapid production of a frozen liquid, comprising a bundled group of upright small-diameter cooling tubes, a slender core evaporator mounted in each cooling tube, a common jacket evaporator mounted to surround said bundled group of cooling tubes, conduit means for circulating a refrigerant through the core evaporators and the jacket evaporator, and means for alternately supplying liquified and warm refrigerant to the conduit means for respective freezing and thawing of liquid filling said tubes, said conduit means comprising a main refrigerant circuit for circulating the refrigerant simultaneously through the core evaporators and a subsidiary branch of the main circuit for conducting the refrigerant from the core evaporators to the common jacket evaporators.

2. The refrigeration plant of claim 1, comprising striction means in said subsidiary branch to obtain different rates of refrigerant circulation in the core evaporators and in the common jacket evaporator.

3. The refrigeration plant of claim 2, wherein said striction means are adjustable.

4. In a refrigeration method for the rapid production of hollow liquid frozen rods in molds defined by the walls of a core evaporator and a jacket evaporator, comprising circulating cold and hot refrigerant through the evaporators during alternating freezing and defrosting cycles, filling the molds with liquid to be frozen, and breaking the frozen rods; manually effecting an initial freezing and defrosting cycle to produce a first harvest of said frozen rods, automatically controlling the refrigerant circulation to the respective evaporators during the freezing and defrosting cycles, actuating the automatic control in response to the elongation of the rods as the liquid is frozen, filling the molds with said liquid before the start of each freezing cycle and breaking the frozen rods after each defrosting cycle.

5. In a refrigeration plant for the rapid production of hollow frozen liquid rods: a bundled group of upright small-diameter cooling tubes, a core evaporator in each tube, a common jacket evaporator surrounding all of said tubes, a common bottom flap pivotally mounted for sealing all the tubes, an independently tiltable counter-balance for restoring the flap to its closed position after it has been swung open by the gravity-harvested frozen rods, the flap having grooves facing the tubes to provide intercommunicating channels between all the tubes to level out the liquid initially filled into them for freezing, conduit means for circulating a refrigerant through the core evaporators and the jacket evaporator, and means for alternately supplying liquified and warm refrigerant to the conduit means for respective freezing and thawing of liquid filling said tubes, said conduit means comprising a main refrigerant circuit for circulating the refrigerant simultaneously through the core evaporators and a subsidiary branch of the main circuit for conducting the refrigerant from the core evaporators to the common jacket evaporator.

References Cited in the file of this patent

UNITED STATES PATENTS

| | | |
|---|---|---|
| 208,304 | Gamgee | Sept. 24, 1878 |
| 489,387 | Muller | Jan. 3, 1898 |
| 2,438,466 | Tobey | Mar. 23, 1948 |
| 2,721,452 | Brandin et al. | Oct. 25, 1955 |
| 2,723,534 | Wilbushewich | Nov. 15, 1955 |
| 2,768,507 | Hoen | Oct. 30, 1956 |